United States Patent [19]
Nepela et al.

[11] Patent Number: 5,793,550
[45] Date of Patent: Aug. 11, 1998

[54] MAGNETORESISTIVE HEAD USING SENSE CURRENTS OF OPPOSITE POLARITIES

[75] Inventors: Daniel A. Nepela, San Jose; Amritpal S. Rana, Fremont, both of Calif.

[73] Assignee: Read-Rite Corporation, Milpitas, Calif.

[21] Appl. No.: 636,059

[22] Filed: Apr. 23, 1996

[51] Int. Cl.$^6$ .............................. G11B 5/03; G11B 5/127
[52] U.S. Cl. .............................. 360/66; 360/113
[58] Field of Search .............................. 360/113, 66, 75, 360/77.04, 63, 61; 338/32 R; 324/207.21, 252

[56] References Cited

U.S. PATENT DOCUMENTS

| | | | |
|---|---|---|---|
| 5,367,411 | 11/1994 | Nishiyama et al. | 360/66 |
| 5,444,589 | 8/1995 | Hu et al. | 360/113 |
| 5,572,379 | 11/1996 | Aoi et al. | 360/113 |
| 5,606,470 | 2/1997 | Shioya et al. | 360/66 |
| 5,615,063 | 3/1997 | Kuroki et al. | 360/78.04 |
| 5,719,729 | 2/1998 | Koyama et al. | 360/113 |

*Primary Examiner*—Andrew L. Sniezek
*Assistant Examiner*—Regina Y. Neal
*Attorney, Agent, or Firm*—Robert King; Samuel A. Kassatly

[57] ABSTRACT

A magnetoresistive head achieves maximum signal output with minimal electromigration by use of two increased direct currents with different polarities which are directed periodically through a magnetoresistive element in opposite directions, with minimal long term directional diffusion for minimizing electromigration and for increasing the signal output. The magnetoresistive element defines two magnetic centers $MC^+$ and $MC^-$ that correspond to the polarities of the two currents, and the magnetic centers are positioned at optimal magnetic locations.

9 Claims, 2 Drawing Sheets

MAGNETORESISTIVE HEAD USING SENSE CURRENTS OF OPPOSITE POLARITIES

FIELD OF THE INVENTION

This invention relates to magnetoresistive heads and in particular to a magnetoresistive element for reading data recorded on a magnetic medium which realizes optimal signal output with minimal risk of electromigration.

DESCRIPTION OF THE PRIOR ART

Disk drives typically include a stack of spaced apart magnetic disks which are mounted on a common shaft, and an actuator arm assembly comprising a plurality of arms extending into the spaces between the disks. Mounted on the distal end of each arm is a resilient load beam which supports a miniaturized gimbal assembly. The gimbal assembly includes an air bearing slider pivotally attached to a flexure. Magnetic transducers, employed to interact with the disks, are affixed to the slider.

In presently known disk drives, the magnetic transducers include inductive elements for recording data onto a disk, and magnetoresistive (MR) elements for reading the recorded data from the disk. The operation of the MR element is based on the principle that the resistance of certain materials changes when subjected to a magnetic field. Output signals from the MR element are generated by supplying it with a constant direct electrical current. The flux from the magnetic disk that is seen by the sensing MR element is reflected by a change in voltage that is proportional to the change in resistance of the material caused by the flux.

One objective when using a flying head or air bearing slider on which the MR element is deposited to operate in a transducing relationship with the disk is to increase the current density through the MR element in order to maximize the output signal.

However, a problem with increasing the current density is the failure caused by electromigration. The electromigration phenomenon occurs when a unidirectional current flows through the MR element and directonally biases the atom motion and/or diffusion within the MR element, resulting in an ultimate electrical open in the MR element that is preceded by increasing MR element resistance, increased operating temperature, and eventual catastrophic damage to the MR element.

SUMMARY OF THE INVENTION

An object of this invention is to provide an MR head that realizes maximum signal output with minimal risk of electromigration.

Another object of this invention is to alternately flow increased direct currents with different polarities through the MR element, with minimal long term directional diffusion, for the purpose of increasing the signal output.

According to this invention, a magnetoresistive head operates with two optimal direct currents having different polarities that periodically flows through an MR element for the purpose of minimizing long term directional diffusion and for increasing the signal output and for substantially suppressing electromigration in the directions of the currents. The MR element defines two magnetic centers $MC^+$ and $MC^-$ that correspond to the polarities of the two currents. In one embodiment, the direct currents flowing through the MR element are reversed for approximately equal periods that are of short duration relative to the ultimate life of the MR head.

BRIEF DESCRIPTION OF THE DRAWINGS

The invention will be described in greater detail with reference to the drawing in which.

Similar numerals refer to similar elements in the drawing. It should be understood that the sizes of the different components in the figures are not necessarily in exact proportion, and are shown for visual clarity and for the purpose of explanation.

DETAILED DESCRIPTION OF THE INVENTION

Figure 1:
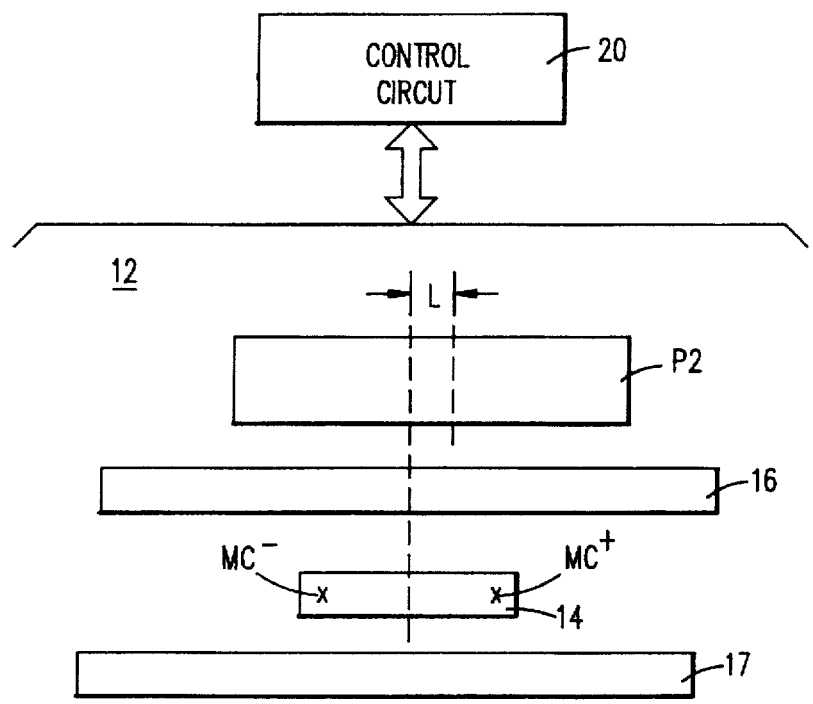
FIG. 1 is a representational view depicting part of the air bearing surface of a slider, and showing the position of an MR element relative to an inductive pole and a shared MR shield and inductive pole, according to the invention.

FIG. 1 shows part of an air bearing surface of a slider 12 for use in a MR head in accordance with the present invention. The slider 12 includes an inductive element with a shared MR shield/pole structure. The MR element 14 has a shield-type construction wherein the MR element 14 is disposed between first and second thin film magnetic shields 16, 17 respectively. Shield 16 is part of the magnetic circuit of the inductive write transducer.

The geometric centers of the pole P2 and the MR element 14 are offset by a predetermined distance "L". The offset distance L is a function of the skew angle range of the magnetic disk/transducer combination. The skew angle range is typically between $-5°$ for the inner diameter track and $+15°$ for the outer diameter track of the magnetic disk. For any fixed skew angle range, L is a constant. The offset distance L is determined by the following equation:

$$L = S \cdot \mathrm{Tan}\Theta_{MD},$$

where S is the spacing between the MR element 14 and the pole P2, and $\Theta_{MD}$ is the middle track skew angle and is defined as follows:

$$\Theta_{MD} = (\Theta_{ID} + \Theta_{OD})/2.$$

In the above equation $\Theta_{ID}$ and $\Theta_{OD}$ are respectively defined as the skew angles of the inner and outer tracks of the magnetic disk.

In addition to the physical positioning of the MR head relative to the magnetic disk, the control system 20 positions the MR element 14 relative to the track from which data is read, in order to maintain the optimal magnetic position of the MR element 14 relative to the magnetic disk. To this end, two magnetic centers $MC^-$ and $MC^+$ are symmetrically defined on either side of the geometric center of the MR element 14, such that $MC^-$ coincides with the peak $P^-$ of the negative micro-track voltage output profile (NMT) shown in FIG. 3, and $MC^+$ coincides with the peak $P^+$ of the positive micro-track voltage output profile (PMT). It should be understood that while conventional MR heads have a single micro-track voltage output profile, this invention makes use of two sequentially occurring positive and negative micro-track voltage output profiles PMT and NMT.

Figure 3:
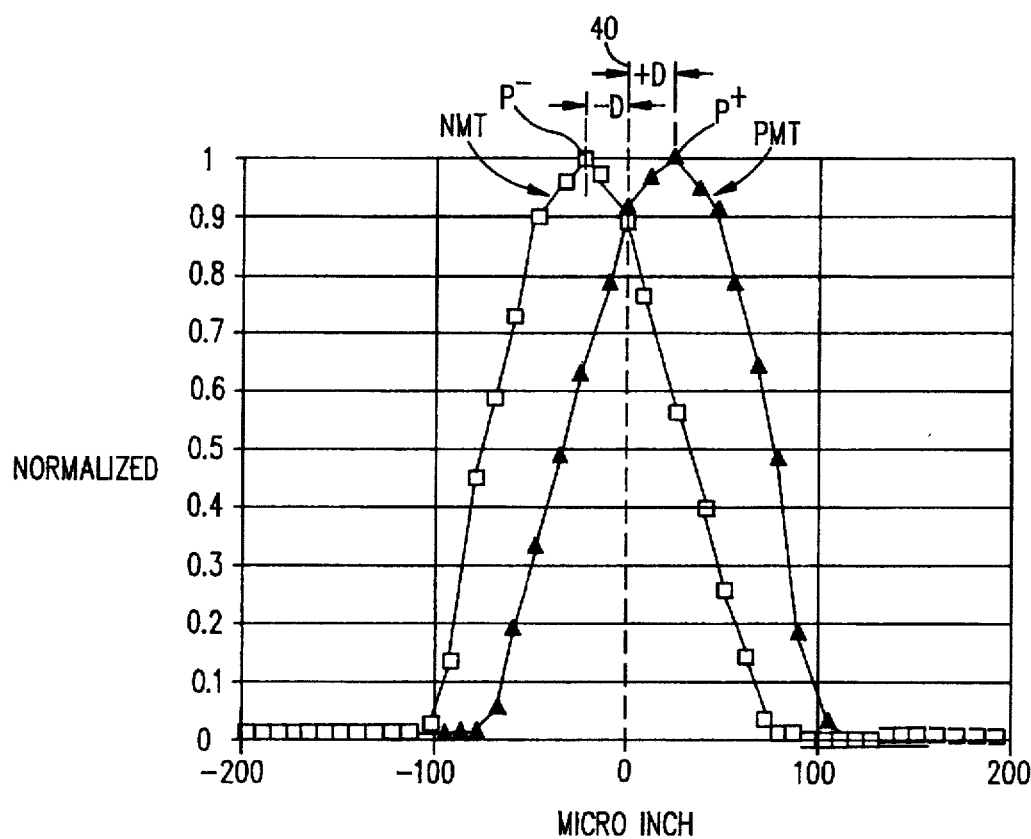
FIG. 3 is a plot of two normalized micro-track voltage output profiles relative to the current direction in the MR sensor.

With reference to FIG. 3, the positive micro-track voltage output profile PMT corresponds to a direct current passing through the MR element 14 in one direction, while the negative micro-track voltage output profile NMT corresponds to a direct current passing through the MR element 14 in the opposite direction. The peak P⁺ is located at a distance or displacement +D from the center line 40 and the peak P⁻ is located at a distance or displacement −D from the center line 40, as shown in FIG. 3. The center line 40 corresponds to the middle track of the magnetic disk. The displacements +D and −D are referred to as micro-jogs and are determined by the geometry of the MR head.

Figure 2:
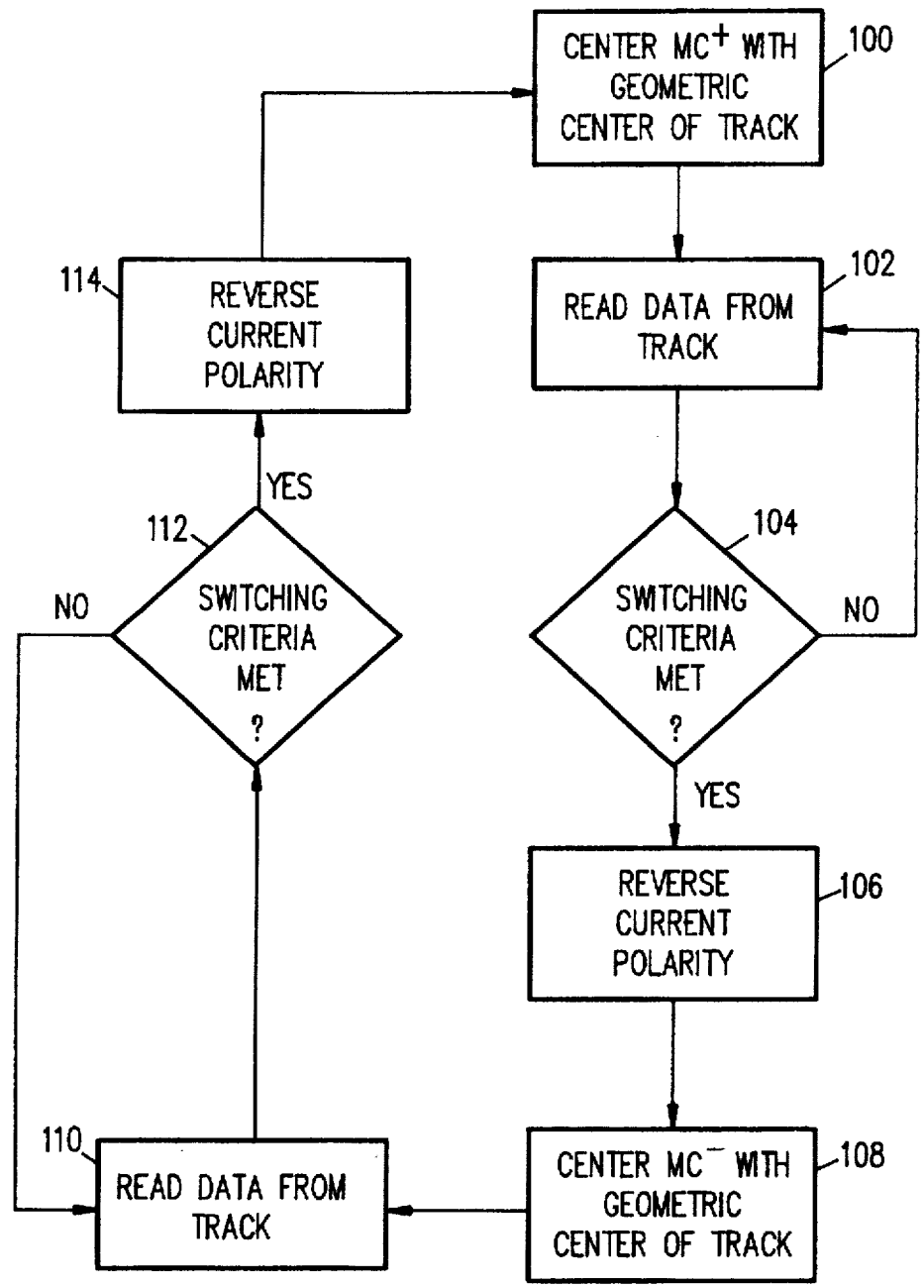
FIG. 2 is a functional flow chart of an MR head operation comprising the slider of FIG. 1.

With reference to FIG. 2 and starting at step 100, the control circuit 20 centers a first magnetic center, such as MC⁺ of the MR element 14 with the peak P⁺ of the positive micro-track voltage output profile PMT, such that MC⁺ coincides with the geometric center of the magnetic track from which data is being read (step 102).

The control circuit 20 then inquires at step 104 whether preset switching criteria have been satisfied. An exemplary criterion would be whether a predetermined time has elapsed between two consecutive reversals of the current polarities. It should be understood that other criteria for minimizing directional diffusion may alternatively be selected. The sense current magnitude and time in each direction may be equal, for example. An important factor in selecting the switching criteria is that electromigration in both directions should remain reversible.

If the preset criteria have not been met, the control circuit 20 continues to read data from the magnetic disk (step 102) and to inquire whether the desired criteria have been met (step 104). If on the other hand the preset criteria have been met, the control circuit 20 reverses the polarity of the current flowing through the MR element 14 (step 106), and simultaneously centers the magnetic center MC⁻ with the peak P⁻ of the negative micro-track voltage output profile NMT, such that point MC⁻ coincides with the geometric center of the magnetic disk track (step 108) from which data is being read (step 110).

The control circuit 20 then checks at step 112 whether the preset switching criteria have been satisfied. It should be noted that the preset criteria checked at steps 104 and 112 are preferably identical, but other criteria may alternatively be selected. If the criteria at step 112 have not been met, the control circuit 20 continues to read data from the magnetic disk (step 110) and to inquire whether the desired criteria have been met (step 112). If the criteria have been met, the control circuit 20 reverses the polarity of the current flowing through the MR element 14 (step 114), and simultaneously centers MC⁺ with the geometric center of the magnetic disk track (step 100). The foregoing process continues for as long as the disk drive remains operational.

In one embodiment of this invention the switching period, i.e., the time between two consecutive reversals of the current polarities (steps 106 through 114) ranges between 2 to 4 hours for a MR head intended to have a mean life of about 5 years. It should be clear that other periods may alternatively be selected.

Since electromigration within the MR element 14 has been suspended, the next objective is to determine the maximum current that could flow through the MR element 14 without inducing damaging diffusion effects. It is expected that by utilizing equal currents in two opposite directions for approximate equal time periods, the current density through the MR element 14 may be effectively doubled, resulting in approximate doubling of the output signal for the same MR element, i.e., a gain of at least 6 dB in the MR head, and hence improved signal-to-noise ratio.

For example, conventional MR heads are generally operated between 20° C. and 30° C. above ambient temperature. However, an MR head incorporating the present invention may be operated at 150° C. or more above ambient temperature, thus significantly improving the signal output of the MR element 14.

The analysis for obtaining optimal operating current will now be presented. Presuming that the diffusion of Ta (tantalum) into a 300 Angstrom-thick MR element made of NiFe, the activation energy (A) is estimated to be 71 Kcal (kilocalories). The following equations may then be solved for the temperature (T):

$$D = D_o \cdot e^{31.4/RT} = x^2/2t$$

where D is the diffusion constant; $D_o$ is a constant approximately equal to unity; R is a constant and is equal to 1.98; T is the operating temperature in degrees Kelvin; x is the diffusion distance; and t refers to the time to reach a disabling diffusion condition, namely the life of the MR head. In one embodiment t is estimated to be 5 years. Using the above estimates, the operating temperature T of the MR element 14 is found to be approximately 150° C. above ambient temperature.

Considering that the power ($I^2R$) is proportional to the operating temperature T, the current (I) flowing through the MR element 14 would be at least twice that in conventional MR heads. This substantial increase in current automatically translates into a corresponding increase in output signal.

It should be understood that the geometry, dimensions and parameters described above may be modified within the scope of the invention. For example, the inventive concept presented herein is equally applicable to spin valves and GMR structures.

What is claimed is:

1. A magnetoresistive head for reading data from a data storage medium, comprising:

a magnetoresistive element through which two direct currents of different polarities are flown sequentially, periodically, in opposite directions;

said magnetoresistive element defining first and second magnetic centers MC⁺ and MC⁻ corresponding respectively to the polarities of said two currents; and a control circuit for sequentially repositioning said first and second magnetic centers MC⁺ and MC⁺ relative to the medium, and for sequentially switching said two currents as said magnetic centers MC⁺ and MC⁻ are being repositioned, such that electromigration in said magnetoresistive element is substantially suppressed in the directions of said two currents.

2. A magnetoresistive head according to claim 1 further including an inductive pole P2 having a geometric center, wherein said magnetoresistive element has a geometric center;

wherein said geometric centers of said pole P2 and said magnetoresistive element are offset by a predetermined distance L for positioning said magnetoresistive element over said magnetic medium, so that as the magnetoresistive head moves between an inner diameter track and an outer diameter track of said magnetic medium, said control circuit adjusts the position of said magnetoresistive element relative to a radial location of a track from which data are read.

3. A magnetoresistive head according to claim 2, wherein said offset distance L is determined by the following equation:

$$L = S \cdot \tan\Theta_{MD},$$

where S connotes the spacing between said magnetoresistive element and said pole P2, and $\Theta_{MD}$ is a middle track skew angle.

4. A magnetoresistive head according to claim 1, wherein said two direct currents of different polarities are substantially equal in magnitude and have substantially equal operating times.

5. A magnetoresistive head according to claim 1, wherein said magnetic center $MC^-$ coincides with a peak $P^-$ of a negative micro-track voltage output profile (NMT); and wherein said magnetic center $MC^+$ coincides with a peak $P^+$ of a positive micro-track voltage output profile (PMT).

6. A magnetoresistive head according to claim 5, wherein said peak $P^+$ is located at a distance 2D from said peak $P^-$, where D is a micro-jog of said peaks $P^+$ and $P^-$ from a centerline of a middle data track of the data storage medium.

7. A method for reading data from a data storage medium using a magnetoresistive head comprising:

periodically, sequentially flowing two direct currents of different polarities through a magnetoresistive element in different directions, said magnetoresistive element defining two magnetic centers $MC^+$ and $MC^-$ corresponding to the polarities of said two currents; and sequentially repositioning said first and second magnetic centers $MC^+$ and $MC^-$ relative to the medium, and sequentially switching said two currents as said magnetic centers $MC^+$ and $MC^-$ are being repositioned, such that electromigration in said magnetoresistive element is substantially suppressed in the directions of said two currents.

8. A method according to claim 7, wherein said step of directing said two approximately equal direct currents includes directing said two currents through said magnetoresistive element for approximately equal time periods.

9. A method according to claim 8, wherein said step of periodically positioning includes the steps of:

coinciding said magnetic center $MC^-$ with a peak $P^-$ of a negative micro-track voltage output profile (NMT); and coinciding said magnetic center $MC^+$ with a peak $P^+$ of a positive micro-track voltage output profile (PMT).

* * * * *